United States Patent
Gray (10) Patent No.: US 7,380,038 B2
(45) Date of Patent: May 27, 2008

(54) PRIORITY REGISTERS FOR BIASING ACCESS TO SHARED RESOURCES

(75) Inventor: Jan Stephen Gray, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 151 days.

(21) Appl. No.: 11/051,148

(22) Filed: Feb. 4, 2005

(65) Prior Publication Data
US 2006/0179196 A1 Aug. 10, 2006

(51) Int. Cl.
*G06F 13/14* (2006.01)
*G06F 12/00* (2006.01)
*G06F 13/18* (2006.01)
*G06F 13/38* (2006.01)

(52) U.S. Cl. .................. 710/243; 710/116; 710/240; 718/103

(58) Field of Classification Search .............. 710/116
See application file for complete search history.

(56) References Cited

U.S. PATENT DOCUMENTS

| | | | | |
|---|---|---|---|---|
| 5,339,443 | A * | 8/1994 | Lockwood | 710/244 |
| 5,870,560 | A * | 2/1999 | Zulian | 709/225 |
| 5,884,051 | A * | 3/1999 | Schaffer et al. | 710/107 |
| 6,279,066 | B1 * | 8/2001 | Velingker | 710/240 |
| 6,684,280 | B2 * | 1/2004 | Chauvel et al. | 710/244 |
| 6,910,212 | B2 * | 6/2005 | Brenner et al. | 718/104 |
| 7,006,521 | B2 * | 2/2006 | Nguyen et al. | 370/462 |
| 7,051,133 | B2 * | 5/2006 | Takata | 710/111 |
| 2002/0057711 | A1 * | 5/2002 | Nguyen et al. | 370/462 |
| 2002/0062427 | A1 * | 5/2002 | Chauvel et al. | 711/151 |
| 2002/0078119 | A1 * | 6/2002 | Brenner et al. | 709/102 |
| 2002/0083251 | A1 * | 6/2002 | Chauvel et al. | 710/240 |
| 2002/0116438 | A1 * | 8/2002 | Tu et al. | 709/104 |
| 2003/0145144 | A1 * | 7/2003 | Hofmann et al. | 710/110 |
| 2006/0037020 | A1 * | 2/2006 | Accapadi et al. | 718/102 |
| 2006/0064695 | A1 * | 3/2006 | Burns et al. | 718/100 |
| 2006/0136925 | A1 * | 6/2006 | Tu et al. | 718/104 |

FOREIGN PATENT DOCUMENTS

EP    1207457 A1 *  5/2002

OTHER PUBLICATIONS

Gibbs, W. Wayt, "A Split at the Core," *Scientific American*, Nov. 2004, pp. 96-101.

* cited by examiner

*Primary Examiner*—Paul R. Myers
*Assistant Examiner*—Ryan M Stiglic
(74) *Attorney, Agent, or Firm*—Woodcock Washburn LLP (57) ABSTRACT

A priority register is provided for each of a multiple processor cores of a chip multiprocessor, where the priority register stores values that are used to bias resources available to the multiple processor cores. Even though such multiple processor cores have their own local resources, they must compete for shared resources. These shared resources may be stored on the chip or off the chip. The priority register biases the arbitration process that arbitrates access to or ongoing use of the shared resources based on the values stored in the priority registers. The way it accomplishes such biasing is by tagging operations issued from the multiple processor cores with the priority values, and then comparing the values within each arbiter of the shared resources.

10 Claims, 8 Drawing Sheets

Shared Resource Arbitration Among Processors With Priority Registers 300

Fig. 3

High Level View of A Multi-Core System 400a

Fig. 4A

Detailed View of A Multi-Thread System 400b

PRIORITY REGISTERS FOR BIASING ACCESS TO SHARED RESOURCES

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2004, Microsoft Corp.

FIELD OF THE INVENTION

The present invention relates generally to multicore processors. More particularly, the present invention relates to priority registers for biasing allocation of or access to shared resources, and still more particularly, to registers that store priority values which bias an arbiter performing arbitration among a plurality of processor cores competing for the shared resources.

BACKGROUND

Over the last several decades, transistors have been getting smaller and faster. For example, today a typical consumer microprocessor can contain over 100 million transistors subsisting on a die no bigger than a hundred square millimeters. At the same time, it can handle clock speeds in the range of 3 GHz.

With this increasing miniaturization, heat and power budgets are becoming more crucial. The peak power consumption of a microprocessor has soared to well over 100 watts in recent times as chipmakers have increased clock speeds, and the thermal density in excess of 100 W/cm$^2$ is approaching practical limits.

Another concern in current microprocessors is the relatively slow connection between the processor and main memory. A typical processor runs several hundred times faster than information can be fetched from memory, so that a processor waits an eternity, relatively speaking, for data to arrive from memory.

One way to resolve this problem is to employ on-chip memory caches and instruction-level parallelism to keep the processors busy on one set of instructions while other instructions are waiting for data to arrive. However, even this instruction-level parallelism is approaching its limits, because an exponential growth in transistors and power is required to achieve a modest improvement in instruction-level parallelism.

One solution to these problems is to exploit parallelism by dividing a processing chip into multiple cores. For example, a hypothetical notebook processor might have eight cores, where a program customized for such a chip could present many threads of execution, each running simultaneously on a different core.

In such a multicore system, each core will have its own local resources, such as register files, branch predictors, and local caches, and it will also share resources with other cores, such as on-die L3 caches, memory channels, and possibly shared functional units. Such shared resources may need to be arbitrated not only in a fair and neutral way, as in the case of balanced parallel software codes, but also in a biased manner, as when some cores are running main user computation threads while other cores are running lower priority or "housekeeping" threads. It would be advantageous to provide a mechanism for software to manage, influence, or bias arbitration of such shared resources among a plurality of cores running threads of differing performance requirements.

SUMMARY OF THE INVENTION

In a multi-core system, processor cores located on a die typically have their own local computing resources, but they may also share resources with other processor cores on the die. In one aspect of the invention, a first priority register is provided, where the first priority register corresponds to a first processor core on the die. The die may contain a second processor core which has its own corresponding second priority register. Values are stored in both the first priority register and the second priority register. These values are then used to bias the access of the two processor cores to shared resources, so that the first processor core accesses shared resources at the expense of the second processor core, or vice versa.

In another aspect of the invention, the priority registers bias an arbiter allocating access to shared resources. Specifically, the priority registers tag shared resource access signals emanating from processor cores. Threads running on the processor cores with higher tagged values receive proportionately more access to shared resources than threads with lower tagged values. For example, one thread could receive 75% of the shared resources while a lower priority thread would receive the remaining 25% of shared resources. Values stored in the priority registers can be constant or can be relative to other priority registers.

In another aspect of the invention, the operating system sets the values in the priority registers, which can be privileged read and write registers. The values can be updated based on a variety of events, such as context switches. Thus, changing software conditions (such as process or thread reprioritization and rescheduling) can directly influence hardware resource arbitration decisions, which in turn ensures higher perceived system performance, because higher priority tasks receive preferential access to shared resources.

BRIEF DESCRIPTION OF THE DRAWINGS

The foregoing summary, as well as the following detailed description of the invention, is better understood when read in conjunction with the appended drawings. In order to illustrate the invention, exemplary embodiments are shown depicting various aspects of the invention. However, the invention is not limited to the specific systems and methods disclosed. The following figures are included.

DETAILED DESCRIPTION OF ILLUSTRATIVE ASPECTS OF THE INVENTION

Certain specific details are set forth in the following description and figures to provide a thorough understanding of various aspects of the invention. Certain well-known details often associated with computing and software technology are not set forth in the following disclosure, however, to avoid unnecessarily obscuring the various aspects of the invention. Further, those of ordinary skill in the relevant art will understand that they can practice other aspects of the invention without one or more of the details described below. Finally, while various methods are described with reference to steps and sequences in the following disclosure, the description as such is for providing a clear implementation of aspects of the invention, and the steps and sequences of steps should not be taken as required to practice this invention.

Figure 1A:
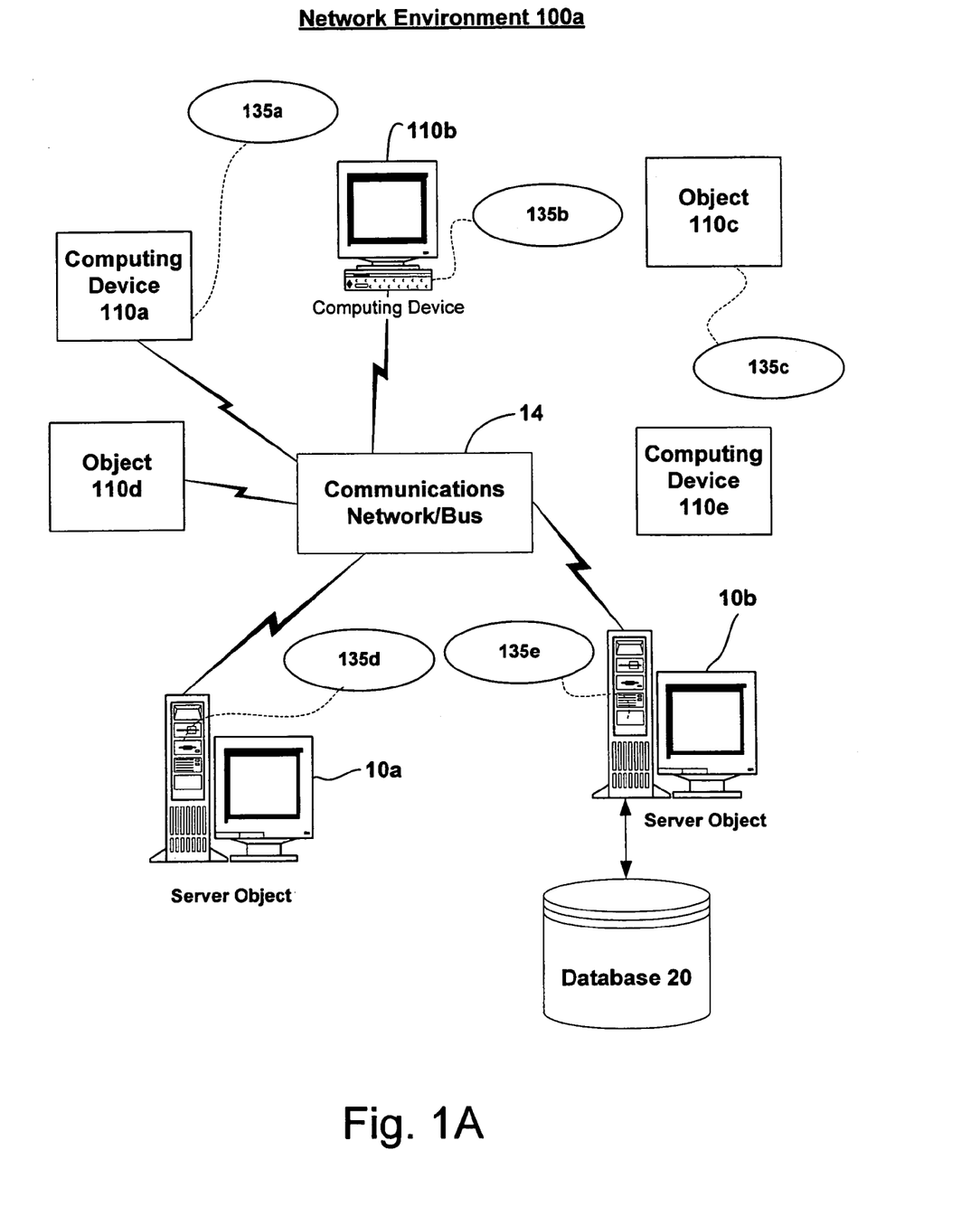
FIG. 1A provides a schematic diagram of an exemplary networked or distributed computing environment.

The following detailed description will generally reflect the summary of the invention, as set forth above, further explaining and expanding the definitions of the various aspects of the invention as necessary. The first part of the description is dedicated to exploring the exemplary computing and network environments. To this end, a networked computing environment is set forth as illustrated in FIG. 1A. This networked computing environment is an extension of the basic computing environment illustrated in FIG. 1B, which is suitable to implement the software and/or hardware techniques associated with the invention.

Figure 2:
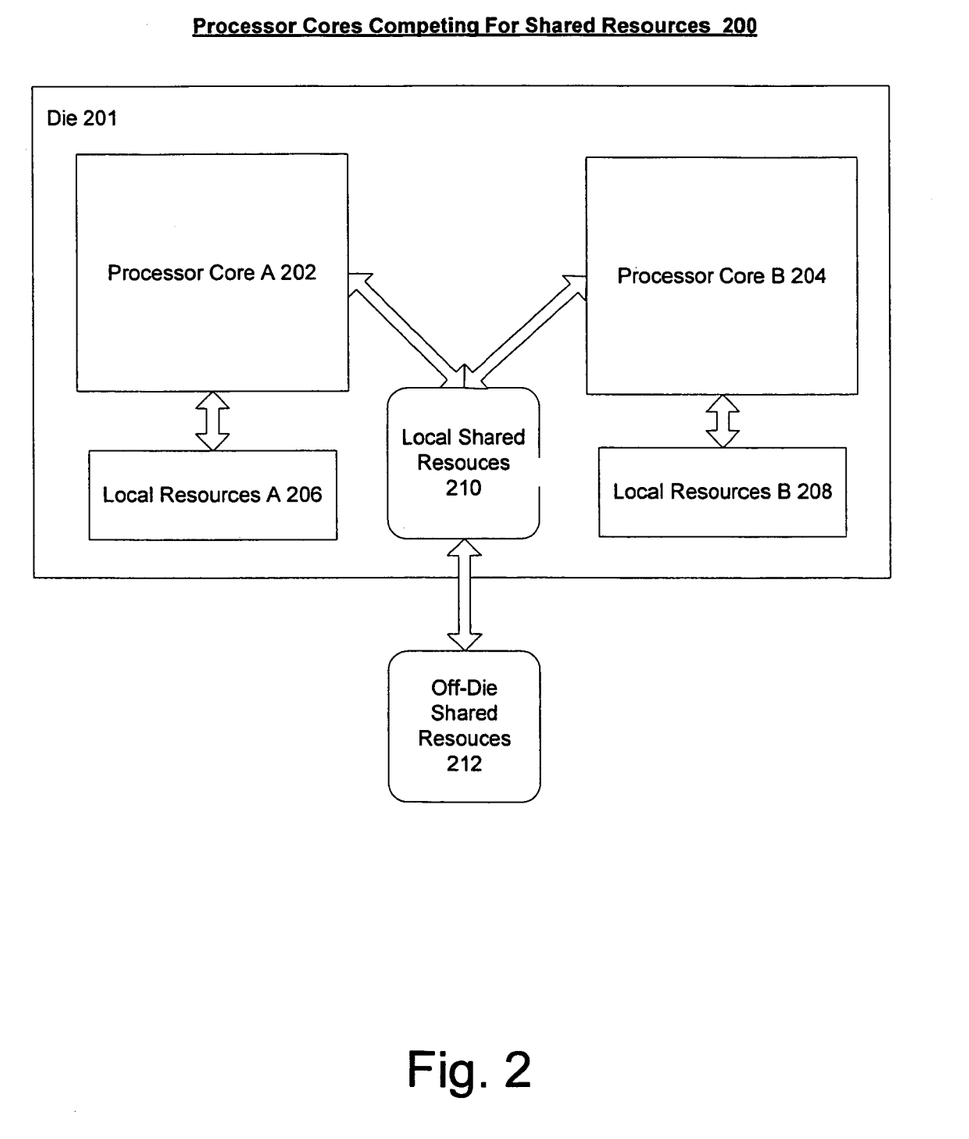
FIG. 2 illustrates competition among processor cores for shared resources, where the shared resources may be located on the die or off the die.
Figure 3:
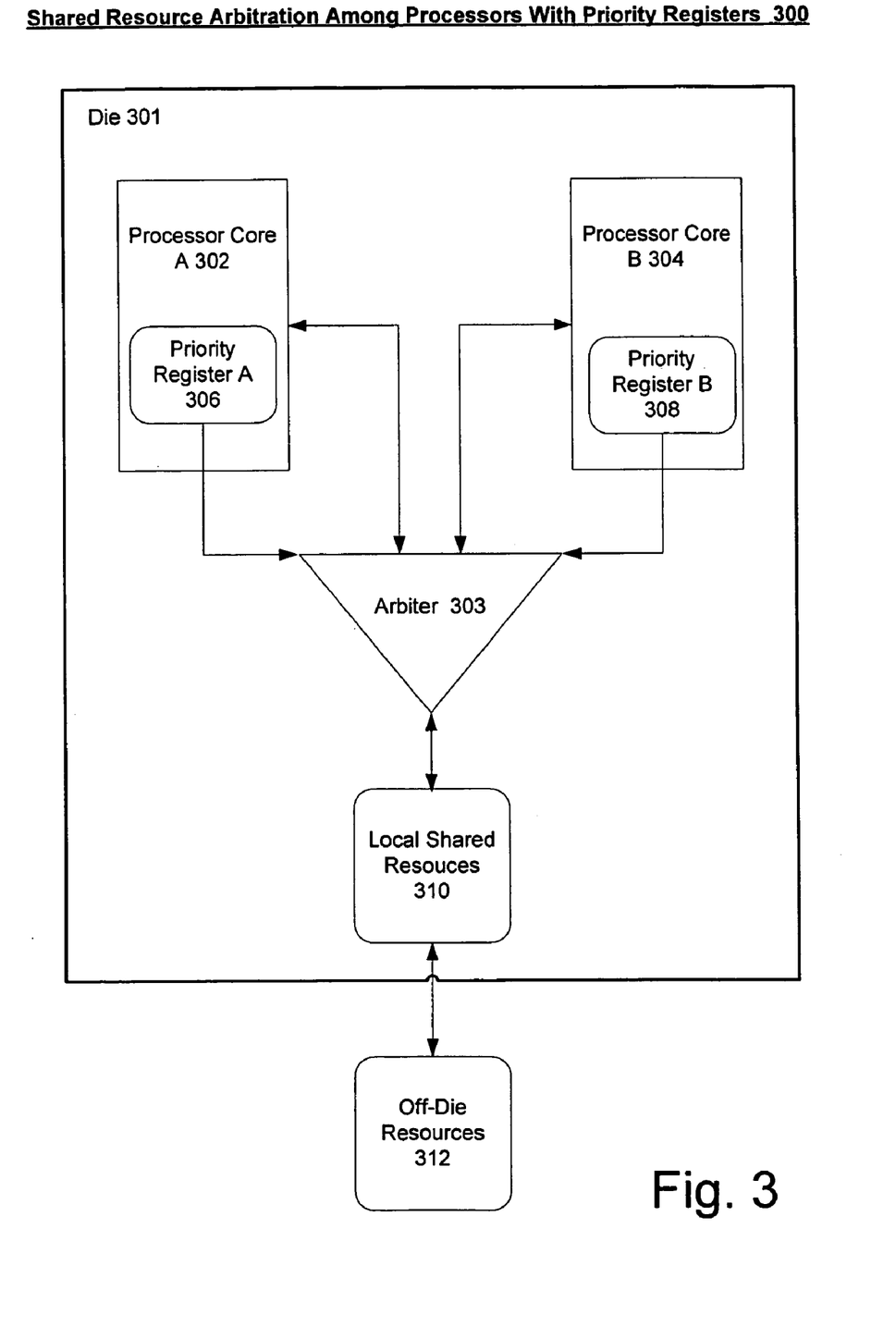
FIG. 3 illustrates shared resource arbitration among processor cores with priority registers, where the priority registers bias an arbiter.
Figure 4A:
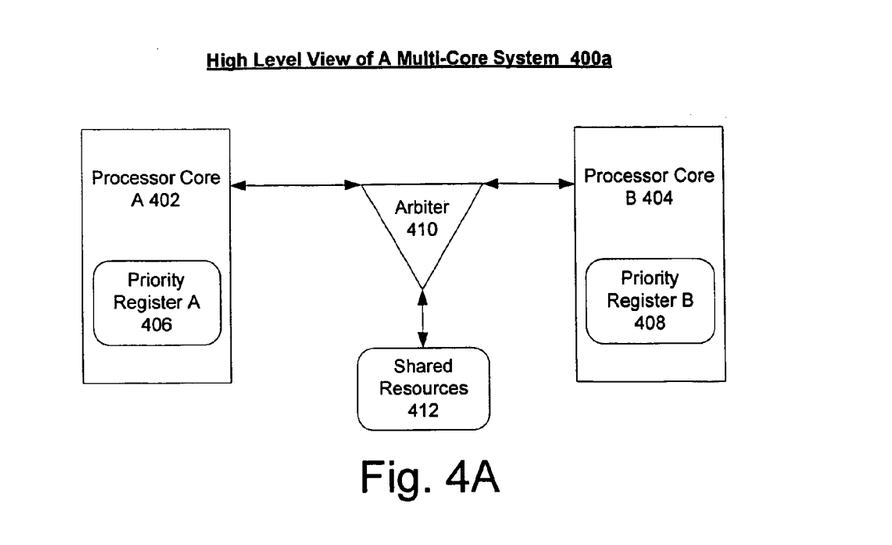
FIG. 4A illustrates a high level view of a multi-core system, where an arbiter provides access to shared resources.
Figure 4B:
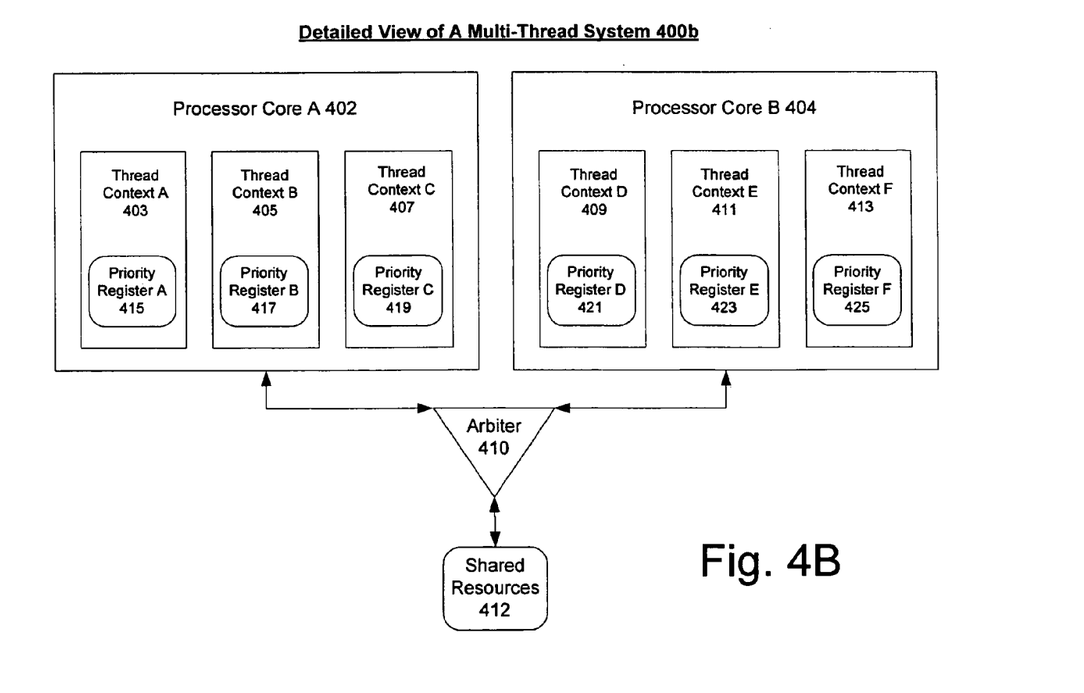
FIG. 4B illustrates a detailed view of a multi-core system, where individual thread contexts are assigned priority registers.
Figure 5:
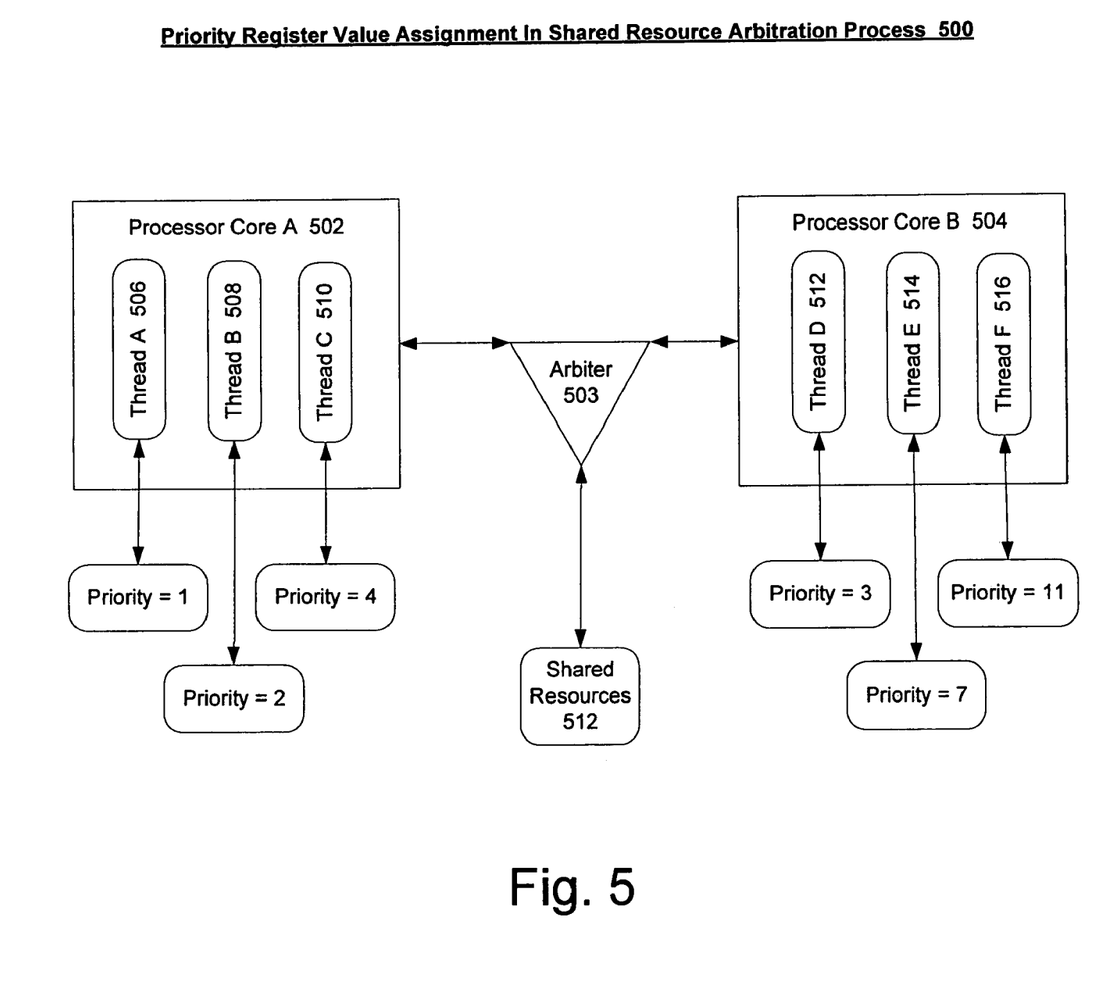
FIG. 5 illustrates typical values assigned to priority registers, and how these values determine shared resource allocation.
Figure 6:
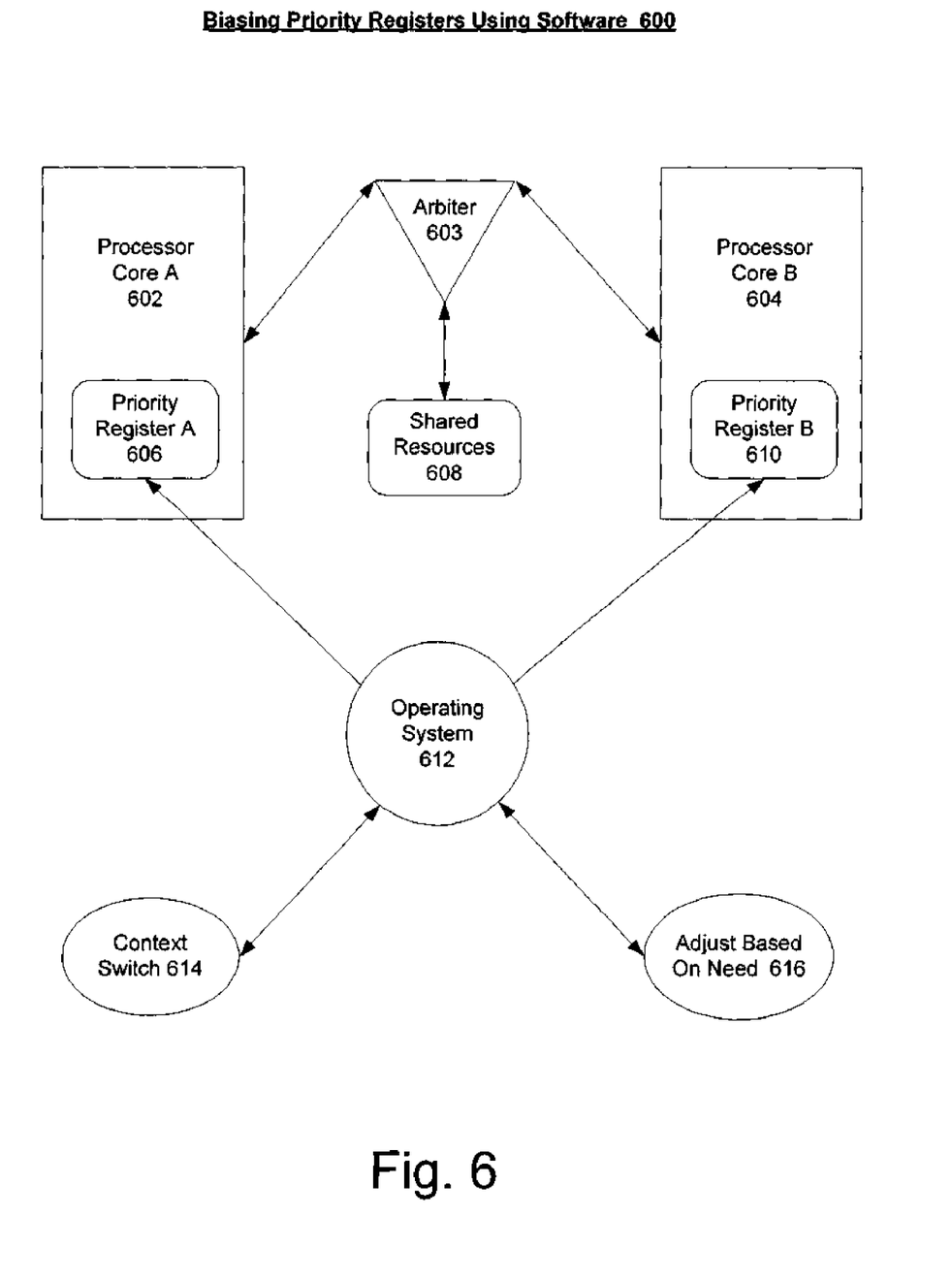
FIG. 6 illustrates the setting of values in priority registers using software, specifically, the operating system, in order to bias shared resource allocation.
Figure 7:
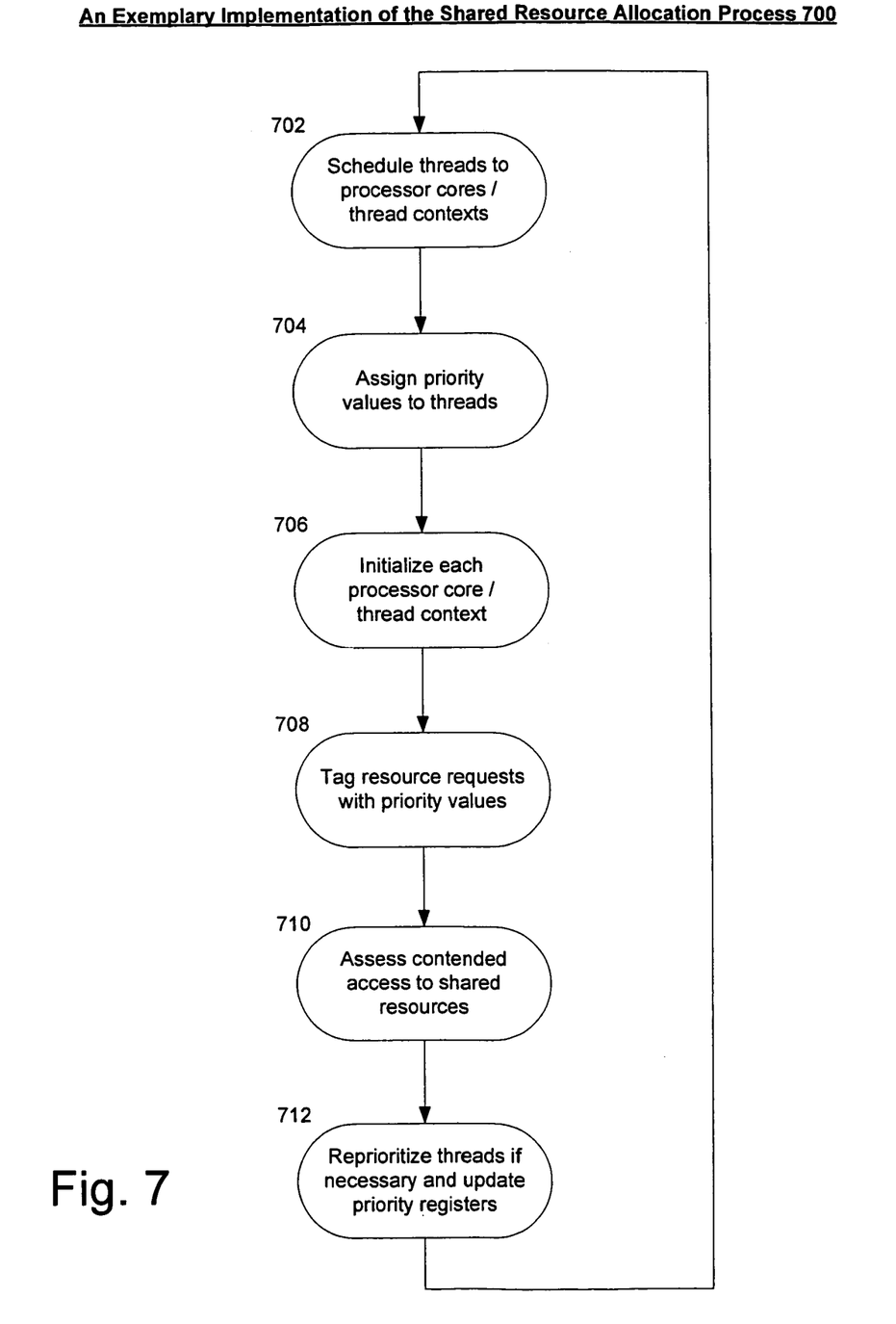
FIG. 7 illustrates an exemplary implementation of the shared resource allocation process.

The second part of the description is dedicated to exploring priority registers for biasing shared resource arbitration. To this end, FIGS. 2 through 7 illustrate various aspects of the invention. FIG. 2 illustrates processor cores competing for shared resources, whether they are local shared resources or off-die shared resources. FIG. 3 focuses on the arbitration process among the various processors. Such an arbitration process is biased by the values stored in the priority registers. FIGS. 4A and 4B present a high-level and a detailed view, respectively, of certain aspects of the invention. FIG. 4A illustrates how an arbiter arbitrates between two processor cores access to shared resources. FIG. 4B gives a more detailed illustration of a multi-threaded system, with multiple thread contexts, where each thread is tagged by some priority register value. FIG. 5 demonstrates how priority register values bias the arbitration process performed by an arbiter. Thus, specific values are given and the priority relationship between various threads is determined. In one interesting aspect of the invention, FIG. 6 illustrates an operating system that can set the priority register values based on context switches or on apparent need. Finally, FIG. 7 illustrates an exemplary implementation of the resource allocation process, where the operating system sets the priority register values and the arbiter arbitrates the available shared resources.

Exemplary Computing Environment

FIG. 1A provides a schematic diagram of an exemplary networked or distributed computing environment 100a. The distributed computing environment 100a comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, personal computers, etc. Each object can communicate with another object by way of the communications network 14. This network may itself comprise other computing objects and computing devices that provide services to the system of FIG. 1A, and may itself represent multiple interconnected networks. In accordance with an aspect of the invention, each object 10a, 10b, etc. or 110a, 110b, 110c, etc. may contain an application that might make use of an API, or other object, software, firmware and/or hardware, to request use of the processes used to implement the object persistence methods of the present invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides the infrastructure for widely distributed computing and encompasses many different networks. Any of the infrastructures may be used for exemplary communications made incident to the present invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network(s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 1A, computers 110a, 110b, etc. can be thought of as clients and computer 10a, 10b, etc. can be thought of as servers, although any computer could be considered a client, a server, or both, depending on the circumstances. Any of these computing devices may be processing data in a manner that implicates the object persistence techniques of the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the persistence mechanism of the invention may be distributed across multiple computing devices.

Client(s) and server(s) may communicate with one another utilizing the functionality provided by a protocol layer. For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over any available communications medium.

Thus, FIG. 1A illustrates an exemplary networked or distributed environment 100a, with a server in communication with client computers via a network/bus, in which the present invention may be employed. The network/bus 14 may be a LAN, WAN, intranet, the Internet, or some other network medium, with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to maintain a persisted object.

In a network environment 100a in which the communications network/bus 14 is the Internet, for example, the servers 10a, 10b, etc. can be servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment 100a.

Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135 and with connections or access to various types of storage elements or objects, across which files or data streams may be stored or to which portion(s) of files or data streams may be downloaded, transmitted or migrated. Any computer 10a, 10b, 110a, 110b, etc. may be responsible for the maintenance and updating of a database, memory, or other storage element 20 for storing data processed according to the invention. Thus, the present invention can be utilized in a computer network environment 100a having client computers 110a, 110b, etc. that can access and interact with a computer network/bus 14 and server computers 10a, 10b, etc. that may interact with client computers 110a, 110b, etc. and other like devices, and databases 20.

Figure 1B:
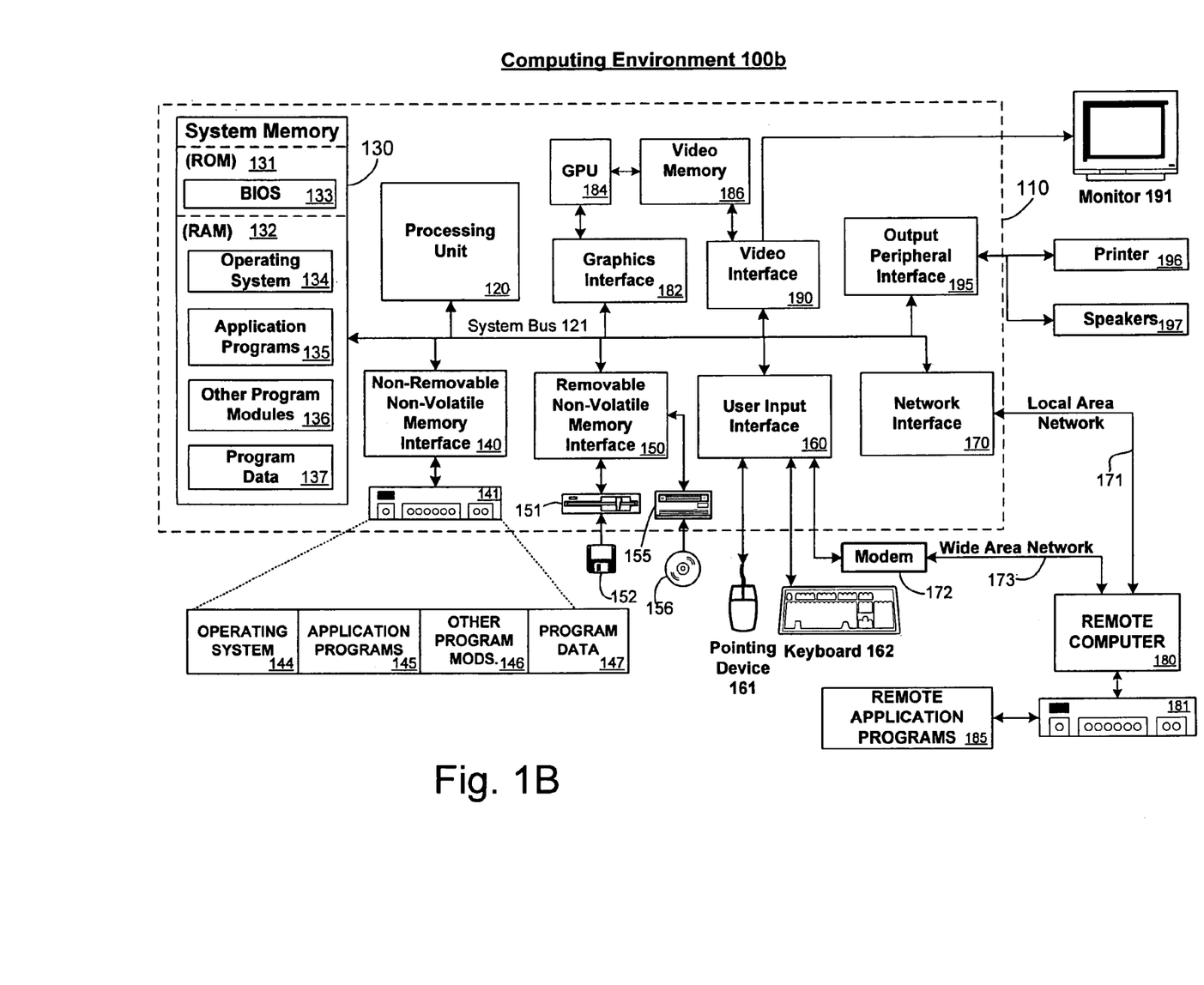
FIG. 1B provides a brief general description of a suitable computing device in connection with which the invention may be implemented.

FIG. 1B and the following discussion are intended to provide a brief general description of a suitable computing device in connection with which the invention may be implemented. For example, any of the client and server computers or devices illustrated in FIG. 1B may take this form. It should be understood, however, that handheld, portable and other computing devices and computing objects of all kinds are contemplated for use in connection with the present invention, i.e., anywhere from which data may be generated, processed, received and/or transmitted in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the object persistence methods of the invention.

Although not required, the invention can be implemented via an operating system, for use by a developer of services for a device or object, and/or included within application or server software that operates in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like.

FIG. 1B thus illustrates an example of a suitable computing system environment 100b in which the invention may be implemented, although as made clear above, the computing system environment 100b is only one example of a suitable computing environment and is not intended to suggest any limitation as to the scope of use or functionality of the invention. Neither should the computing environment 100b be interpreted as having any dependency or requirement relating to any one or combination of components illustrated in the exemplary operating environment 100b.

With reference to FIG. 1B, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1B illustrates operating system 134, application programs 135, other program modules 136, and program data 137.

The computer 110 may also include other removable/non-removable, volatile/nonvolatile computer storage media. By way of example only, FIG. 8 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1B provide storage of computer readable instructions, data structures, program modules and other data for the computer 110. In FIG. 1B, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1B. The logical connections depicted in FIG. 1B include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1B illustrates remote application programs 185 as residing on memory device 181. It will be appreciated that the network connections shown are exemplary and other means of establishing a communications link between the computers may be used.

Aspects of The Priority Register

The priority register seeks to bias arbitration for shared resources in favor of one processor core at the expense of another processor core. Specifically, in a multi-core architecture, each core's priority register value is applied, or "tagged," to the shared resource access signals emanating from that core. In the event multiple cores contend for a shared resource, the shared resource's arbiter may compare these priority tag values to determine which processor core should receive access to the shared resource. The operating system can set a per core priority value in the register based on context switches or whenever an adjustment is proper. The notion is not to starve lower priority requests but rather to bias higher priority requests in such a way that they receive, say, 75% of the available resources, and the lower requests receive 25%.

FIG. 2 illustrates one aspect of the invention, where processor cores are located on a common die and have to compete for shared resources 200. In FIG. 2, a first processor core A 202 and a second processor core B 204 constitute a dual-core processor design stored on a die 201. Numerous processor cores can be stored on the die 201, but for simplicity only two are shown. Likewise, this aspect of the invention also applies to a multiple dice architecture, where a plurality of processor cores are stored on each die, and multiple dice are operatively connected.

In FIG. 2, each processor core has its own local resources and also shares non-local resources. Specifically, processor core A 202 has its local resources A 206 but also shares local shared resources 210. Similarly, processor core B 204 has its own local resources B 208 but shares with processor core A 202 the shared resources 210. Moreover, resources are not limited to on-die (on-chip) resources, namely local resources A 206, local resources B 208, and local shared resources 210, but also include off-die (off-chip) shared resources 212. Typical local resources, such as resources A 206 and B 208, include register files, translation lookaside buffers (TLBs), branch predictors, local instruction caches (I-caches), data caches (D-caches), and the like. Typical on-die shared resources, such as local shared resources 210, include shared on-die L3 caches, the individual cache lines they manage, external memory controllers (also known as external memory channels), shared functional units, and so on. Typical off-die shared resources include external caches and network interface controllers.

While the local resources are dedicated to individual processor cores, the shared resources are not so dedicated, and thus multiple processor cores can compete for such shared resources. In FIG. 2, processor core A 202 can potentially compete with processor core B 204 for the shared on-chip shared resources 210 and off-die shared resources 212. Such competition must be arbitrated or scheduled if multiple processor core are to work in the most productive and efficient manner.

In existing computer systems, resource contention among competing processor cores is typically arbitrated in a fair and neutral way, which in not inappropriate for balanced parallel software code. However, there are cases where it is desired that the arbitration be biased in such a way that one processor core running user computations at a higher priority be afforded more resources than one running computations at a lower priority. Referring to FIG. 2, it may be more desirable in some cases that processor core A 202 receive more of the shared resources 210 than processor core B 204, since processor core A 202 is running higher priority computations. In short, it is desirable to bias the arbitration of a myriad of resources in favor of one processor core at the expense of another processor core.

Biasing the arbitration of resources can be accomplished through priority registers. FIG. 3 illustrates, in one aspect of the invention, how processor core resource arbitration on a die 301 is implemented 300. An arbiter 303 takes input from at least two priority registers, in this case, priority register A 306 and priority register B 308, respectively. Individual register inputs represent some values, either constant or relative values, that let the arbiter 303 know which processor core has higher priority. Each register is associated to a processor core. For example, register A 306 is associated to processor core A 302, and register B is associated to processor core B 304. There is one priority register dedicated to each processor core in the illustrated aspect of the invention. However, the registers do not have to be so limited, as for example, multiple registers could be assigned to each process running multiple threads.

The arbiter 303 decides which processor core will have access to the local shared resources 310 or to the off-die shared resources 312. In one aspect of the invention, the arbiter 303 allocates resources based on the register inputs, namely, register A 306 and register B 308 values. Thus, if register A 306 has a higher priority value than register B 308, processor core A 302 will have priority over processor core B 304 to access the local shared resources 310 or the off-die shared resources 312. If, on the other hand, register B 308 has higher priority than register A 306, then the reverse is true. This is just one exemplary way to distribute resources, and equivalent devices to an arbitrator can be used.

Additionally, in another aspect of the invention, each resource has its own arbiter. Thus, a local shared resource has an arbiter and an off-die resource has an arbiter. Each arbiter can sit on top of its respective resource and evaluate priority values that are tagged to resource access signals emanating from processor cores sharing a resource. Thus, in FIG. 3, even though for simplicity's sake only one arbiter 303 is shown, namely, the arbiter 303 for the local shared on-die resources 310, the off-die resources 312 can have their own arbiter (not shown). More specifically, each resource can have its own arbiter. Thus, the illustrated off-die resources 312 are an abstraction and in fact may comprise of any number of individual off-die resources, each of which can have its own arbiter.

As mentioned above, existing computer systems disburse resources among competing processors in a fair and neutral way. In contrast to the fair and neutral scheme, the arbiter 303 with priority register A 306 and priority register B 308 affords biased resource arbitration. This means that the arbitration process is no longer necessarily fair and neutral but rather favors one processor core over another processor core. As mentioned above, this biasing is accomplished through the priority registers, where the registers could be privileged read and write registers that can be loaded with priorities.

FIG. 4A illustrates a high-level view of an aspect of the present invention 400a, and it should be compared to FIG. 4B, as it is described below. There is a priority register A 406 within processor core A 402 and a priority register B 408 within processor core B 404. The priority registers 406 and 408 tag resource request signals emanating from the corresponding processor cores A 402 and B 404, respectively, with certain priority values. Based on these values, the arbiter 410 decides the amount of access processor core A 402 will have and the amount of access that processor core B 404 will have to the available shared resources 412. The amount of access can be biased such that, for example, processor core A 402 will have access 75% of the time and processor B 404 will have access 25% of the time. However, based on any one given outcome of resource arbitration, it might be the case that processor core A 402 will 100% of access to the shared resources 412 or that processor core B 404 will have 100% of access to the shared resources 412. But over numerous such contended-access arbitrations, processor core A 402 will have had 75% of the shared resources 412 and processor core B 404 will have had 25% of the shared resources 412. Moreover, it should be noted that such priority values in the registers are not fixed and can be changed by the operating system according to need.

By way of background, an operating system may host a number of processes. Each process may consist of several (software) threads, that typically share the processes' resources including address space, but which have distinct copies of a processor's "architected state", e.g. program counter and register file, as well some memory designated for a subroutine call stack, and other software "per-thread state." One responsibility of the operating system is to schedule these processes' software threads—any given thread may be assigned to a given processor core. In some computer architectures, a given core may contain a plurality of thread contexts. Each thread context may store one thread's architected state (as described above). There may or may not be a correlation between the software threads belonging to one operating system-managed software process and the processor cores or thread contexts within processor cores: a given process's threads may be scheduled to run on several processor cores, or on several thread contexts (i.e. hardware threads) within a single processor core in a chip multiprocessor.

What FIG. 4B illustrates, especially in contrast to FIG. 4A, is processor cores with a plurality of hardware thread contexts 400b. Typically, a processor core hosts one software thread at a time. But, a multithreaded core may host a multitude of software threads via its multitude of hardware thread contexts. Thus, processor core A 402 has three thread contexts, namely, thread context A 403, thread context B 405, and thread context C 407. Each of these thread contexts has its corresponding priority register, register A 415, register B 417, and register C 419, respectively. Resource access requests that result from computations on each thread context are tagged with a software thread's priority register value.

For example, when two threads A1 and A2 (not shown in FIG. 4B) are scheduled to two thread contexts, for example, thread context A 403 and thread context B 405, in processor core A 402, and two threads B1 and B2 are scheduled to two thread contexts, for example, thread context D 409 and thread context E 411, in processor core B 404, their priority registers may be set as follows: {A1: 10; A2: 20; B1: 15; B2: 25}. When processor core A 402 running thread A2 issues a request R1(A) with priority PR(A2) while simultaneously processor core B 404 running thread B2 issues a request R1(B) with priority PR(B2) to the same (now contended) resource R1, R1's arbiter ARB(R1) compares PR(A2) and PR(B2) to help determine, with bias, which request ought to be granted and which denied. Here PR(A2) is less than PR(B2) and so there is a greater likelihood that ARB(R1) will grant access to request R1(B) that came from core B running thread B2.

Priority to shared resources based on priority register values is explicitly illustrated in FIG. 5 to supplement FIG. 4B discussed directly above. In processor core A 502, thread A 506 has a priority of 1, which is stored in its corresponding register 518; thread B 508 has an assigned priority of 2 stored in its corresponding register 520; and, thread C 510 has an assigned priority of 4 stored in its corresponding register 522.

Thus, when a given access to shared resource 512 is contended, thread C 510 will enjoy, for example, more favorable arbiter outcomes (i.e. granted access) than thread A 506. Over a series of 70 contended accesses, for example, there might be 40 grants to thread C 510 versus 20 grants to thread B 508 versus 10 grants to thread A 506. This is just one example. A difference in priority register values may be weighted differently by different arbiters over different shared resources. Given two priority value tags PR1 and PR2, one arbiter might choose to always grant the request to PR1 whenever PR1>PR2; another may use a more sophisticated approach which takes into account PR1, PR2, and history of past arbitration decisions to provide enough fairness that PR2 is not starved for access indefinitely. The values of 1, 2, and 4 stored in priority registers 518, 520, and 522, respectively, are just illustrative of the kinds of values that may be used, and are not limited to being multiples of each other or to any absolute values. Rather, the values may reflect any kind of relationship of access times of the threads that is desired.

Moreover, the arbiter 503 can decide access to the shared resources 512 not only among the threads on processor core A 502 but also the threads on processor core B 504, or both. For instance, just as in the example given above with respect to processor core A 502, the access to the shared resources 512 can be determined for thread D 512 with an assigned priority of 3, thread E 514 with an assigned priority of 7, and thread F 516 with an assigned priority of 11. Additionally, the arbiter 503 can decide among all six threads 506, 508, 510, 512, 514, and 516 as to the priority of each with respect to the other. Thus, for example, thread C 510 with a stored value of 4 will receive less access to the shared resources 512 than thread F 516 with a stored value of 11. Although discrete atomic values are considered here, in full generality, a priority register may be a vector of priority registers, with different values for different resource categories.

Next, in another aspect of the invention, in FIG. 6, software is used to bias priority registers 600. The system illustrated in FIG. 6 is similar to the system illustrated in FIG. 4A, where FIG. 6 shows a processor core A 602, a corresponding priority register A 606, an arbiter 603 determining access to shared resources 608, and a processor core B 604 competing with processor core B 604 for the shared resources 608, where processor core B 604 has its corresponding priority register B 610.

An operating system 612 sets priority register A 606 to a certain value and priority register B 610 to a certain value. This value, as mentioned with reference to FIG. 5, is some constant value or a relative value to other threads' priorities. As just described, these values will subsequently help bias outcomes amongst contended shared hardware resources as the threads issue work against these resources. The operating system 612 determines each scheduled thread's priority register value as a function of operating system notions of process and thread priority, themselves determined to optimize interactive response times, throughput, power management, or other concerns.

Additionally, in some aspects of the invention, user application software hosted by the operating system may issue an operating system call to adjust its thread(s) priorities. Additionally, in some other aspects, user application software may be permitted to read or modify its thread's priority register directly.

To reiterate again, priority biasing by the operating system will typically not starve lower priority threads, but rather will bias higher priority threads to a disproportionate ratio of access to the shared resources. For example, given two threads, the higher priority thread on might get 60% of accesses to the contended resources and a lower priority thread might get the remaining 40% of access. But, the lower priority thread would not be starved to the point that it would not get any uses of the shared resources—although such a scenario is not precluded (depending upon design of priority register values and upon design of each shared resource arbiter).

FIG. 7 displays a simple implementation process of the invention 700. At step 702, an operating system schedules, that is, determines, assignments of runnable software threads to cores or hardware thread contexts within cores. Then, at step 704, the operating system determines what hardware priority register values to assign to each such thread.

At step 706, the operating system performs context switching, which may suspend some of the currently scheduled threads. It then initializes each core or hardware thread context with that software thread's thread state, including its program counter, register file, and its hardware thread priority register.

At step 708, each thread runs for an interval of time, i.e., a time slice, perhaps for a few milliseconds or a few million processor core cycles. During this time, each processor core or each thread within each core may issue many thousands of resource requests to on-chip resources. Each such request is automatically accompanied, i.e., tagged, with that thread's priority register value, which is a mechanism implemented in hardware.

At step 710, when accesses to a shared resource happens to be contended, the priority tags of the agents that initialized the access are compared, and this may bias the arbitration outcome. At step 712, after some period of time, in response to some event (time slice expiration, interrupt, system call, or other event), the operating system may reprioritize its software thread priorities and may then update the hardware thread priority registers to reflect these new priorities. Alternatively, after some period of time, the operating system may elect to reschedule its runnable software threads, assigning a different set of software threads to hardware cores or thread contexts. In the end, this process returns to step 702 and begins again.

While the present invention has been described in connection with the preferred aspects, as illustrated in the various figures, it is understood that other similar aspects may be used or modifications and additions may be made to the described aspects for performing the same function of the present invention without deviating therefrom. For example, a priority register storing priority values was described, where these values subsequently tag resource access signals emanating from the processor cores to bias shared resource arbitration. However, other equivalent devices to the priority register are also contemplated by the teachings herein. Therefore, the present invention should not be limited to any single aspect, but rather construed in breadth and scope in accordance with the appended claims.

What is claimed:

1. A multi-core computer system, comprising:
   a first processor core on a die and a second processor core on the die;
   a first priority register associated with the first processor core and a second priority register associated with the second processor core, wherein at least the second priority register is configured to be assigned on a per-thread basis; and
   an arbiter circuit operatively coupled to the first processor core and the second processor core, wherein the arbiter circuit allocates access to a shared resource available to the first processor core and the second processor core based on a first vector stored in the first priority register and a second vector stored in the second priority register, wherein at least the first vector comprises a plurality of values, and wherein a first value of the plurality of values corresponds to the shared resource and a second value of the plurality of values corresponds to an additional resource.

2. The computer system according to claim 1, wherein the first processor core on the die is operatively coupled to a third processor core on a different die thereby allowing the third processor core access to the shared resource.

3. The computer system according to claim 1, wherein the shared resource is located on the die.

4. The computer system according to claim 3, wherein the shared resource includes at least one of L3 caches, external memory controllers, and shared functional units.

5. The computer system according to claim 1, wherein the shared resource is located off the die.

6. The computer system according to claim 5, wherein the shared resource includes at least one of external caches and network interface controllers.

7. The computer system according to claim 1, wherein at least one of the first priority register and the second priority register is a privileged read and write register.

8. The computer system according to claim 1, further comprising a computer operating system, wherein at least one of the first priority value and the second priority value is set by the computer operating system.

9. The computer system according to claim 8, wherein the operating system sets the first priority value and the second priority value based on a context switch or an apparent need.

10. The computer system according to claim 1, wherein at least the first processor core has a first thread context and a second thread context, wherein the first priority register is associated with the first thread context, and wherein a third priority register is associated with the second thread context.

* * * * *